May 15, 1962 E. R. KRETZMER 3,035,257

CUMULATIVE CODE TRANSLATOR

Filed Sept. 29, 1959 2 Sheets-Sheet 1

| BINARY CODE INPUT | GRAY CODE (WITH PARITY DIGIT) OUTPUT |
|---|---|
| 1 0 0 | 0 0 1 1 |
| 0 1 0 | 0 1 1 0 |
| 1 1 0 | 0 1 0 1 |
| 0 0 1 | 1 1 0 0 |
| 1 0 1 | 1 1 1 1 |
| 0 1 1 | 1 0 1 0 |
| 1 1 1 | 1 0 0 1 |

TOP ROW — BOTTOM ROW

LEFT COLUMN — RIGHT COLUMN

INVENTOR
E. R. KRETZMER
BY [signature]
ATTORNEY

May 15, 1962

E. R. KRETZMER 3,035,257

CUMULATIVE CODE TRANSLATOR

Filed Sept. 29, 1959

2 Sheets-Sheet 2

INVENTOR
E. R. KRETZMER
BY
ATTORNEY

United States Patent Office 3,035,257

Patented May 15, 1962

3,035,257

CUMULATIVE CODE TRANSLATOR

Ernest R. Kretzmer, New Providence, N.J., assignor to Bell Telephone Laboratories, Incorporated, New York, N.Y., a corporation of New York Filed Sept. 29, 1959, Ser. No. 843,102
3 Claims. (Cl. 340—347)

This invention relates to code translators and more particularly to code translators wherein a matrix is employed as a permanent or semi-permanent means of establishing the required translating interconnections between input and output terminals.

In computers and other digital systems, the need often arises for translating information in the form of code groups of pulses from one code to another. Thus it may be desirable to translate between a code wherein one of $n$ input terminals is energized (the so-called one-hot code) into the well-known binary code wherein the same information may be represented by an appropriate permutation between two values on each of $m$ terminals or leads where $n=2^m$. In another common arrangement, it is required to translate between the well-known binary code and the so-called reflected binary or Gray code as disclosed, for example, in Patent 2,632,058 to F. Gray, issued March 17, 1953.

A common arrangement for translating between various codes involves the use of a so-called matrix wherein a plurality of input row conductors and a plurality of output column conductors are provided. Information coded in accordance with the code to be translated is applied to the row conductors and, in selected instances depending upon the translation to be accomplished, is interconnected with appropriate ones of the output column conductors through resistors, unidirectional conductors such as diodes, or the like. All such translators involving interconnections between row and column conductors are such that for a given input code applied to the row conductors, either one column or one row is selected. Thus, in converting from the so-called one-hot to binary code, for example, the one of $n$ row conductors corresponding to the particular amplitude or data to be represented, is energized. Cross-connections between this row conductor and between those column conductors required to represent this quantity in binary form are such that all cross-connections to the particular row selected are effective to produce output quantities on the column conductors and no other cross-connections are selected. In a more complicated arrangement if, for example, it is desired to translate between binary and reflected binary code, it is necessary first to translate the incoming code group to one-hot form and thus select a single row of cross-connections or to produce an output in one column only corresponding to one-hot form and to then perform a conversion from this to reflected binary code in a second matrix.

It is obvious that when high capacities, corresponding to translations between codes having many different values, are required, the number of cross-connections in the matrix becomes very large. Capacitive effects and the difficulty of supplying sufficient energy to drive a matrix having large numbers of cross-connections make it desirable to minimize the size of the matrix required for a given translation. Thus, if it is desired to translate between codes having 128 possible values, it has been necessary to provide a matrix having 128 different row inputs. Larger matrix capacities only aggravate the problem.

It is accordingly the object of the present invention to improve the storage or translating capacity of a matrix translator without increasing the complexity of the storage device wherein the translation is performed.

According to the invention, more efficient use is made of the available capacity of a translator by utilizing at least several column and several row conductors simultaneously in the translation directly between two codes. Thus, the matrix may have input row conductors equal in number to the elements of the code to be translated and output column conductors equal in number to the elements of the code into which translation is to be made. Cross-connections are established between each row conductor and all column conductors upon which an output contribution is required by the particular codes employed when that respective row conductor is energized. In addition, means are provided for combining the contributions present in each column conductor for a given input code group on the input row conductors and for reading the combined quantities corresponding to the column conductor outputs to yield a translated code group.

The above and other features of the invention will be described in the following detailed specification taken in connection with the drawings in which.

Figures 1, 2:
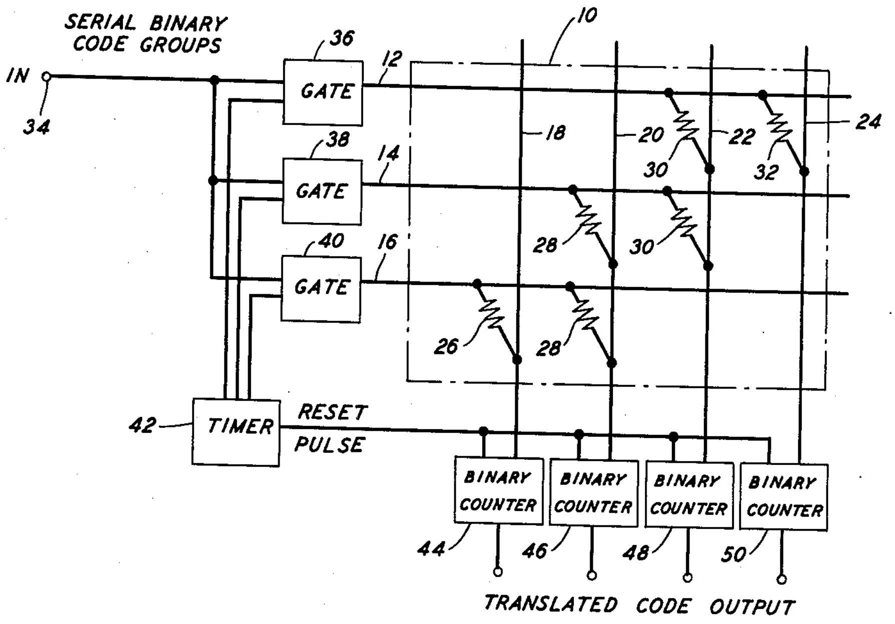
FIG. 1 is a block schematic diagram of a translator according to the invention wherein serially occurring binary code groups may be converted to reflected binary code groups having an additional parity digit and occurring simultaneously on parallel output leads.
FIG. 2 is a chart explanatory of the operation of the translator of FIG. 1.

As shown in FIG. 1, means are provided for translating between conventional binary code and reflected binary code with a parity digit through the use of a matrix 10 having row conductors 12, 14, and 16 and column conductors 18, 20, 22, and 24. Although the nature of the cross-connections between the row and column conductors of the matrix is not of great importance in connection with the present invention, such cross-connections are shown in FIG. 1 as comprising resistors such as 26, 28, 30, and 32. These resistors are connected in accordance with the requirements of the codes employed at the input and at the output in well-known manner and in accordance with certain requirements to be set forth hereinafter. It is to be understood that the cross-connections may preferably comprise solid-state diodes, or alternatively, that the matrix might comprise photo-sensitive cross-connections at every crossing of a row and column conductor, such diodes being energizable in a predetermined pattern by light directed upon the matrix through a mask or punched card to actuate only selected ones of the cross-connections. In these arrangements, sneak-paths are avoided and more freedom is afforded in the choice of driving and load impedances. In any event, the arrangement of the cross-connections may be categorized as being between each of the row conductors and all of the column conductors required to contribute to the code group to which translation is to be made and in accordance with the two codes involved.

The basic approach, according to the present invention, involves the storage of the translating information in more than one row or column of the matrix. In one typical arrangement, as shown in FIG. 1 of the drawings and as outlined by the chart appearing at FIG. 2 of the drawing, a three-element binary code which appears in serial form at input terminal 34, and which may at any particular time take any one of the values shown in the left-hand side of the chart of FIG. 2, is applied to the row conductors 12, 14, and 16 of matrix 10. Since the code groups are hypothesized as arriving in serial form, it is convenient to direct the appropriate code elements to the appropriate ones of the row conductor through a series of gates 36, 38, and 40 which are open in timed order to correspond to the first, second, and third elements, respectively, of an incoming code group under control of a timer 42 of conventional design. The function of timer 42 and the three gates 36, 38, and 40 is merely to direct the appropriate element of the code group to the appropriate one of the row conductors. Each of the row conductors has at least one cross-connection to a column conductor and may have two such cross-connections, depending upon the requirements of the two codes involved. As shown in FIGS. 1 and 2, the translator is arranged to translate between conventional binary code and reflected binary or Gray code to which an additional or parity digit has been added. The basic arrangement of the cross-connections is such that for each ON or "1" pulse of the applied binary code group, a contribution is made to each of the column conductors upon which a contribution is required to permit summing in such a way as to yield a "1" in the desired translated code group. In modulo two addition, for example, such contributions are required either where a single one of the row conductors receives an ON pulse or where ON pulses are present in the incoming code group on an odd number of row conductors.

Since the contributions on each column conductor are present seriatim they may be counted by conventional binary counting means to yield a "1" when an odd number of contributions are cross-connected and to yield a "0" when an even number of cross-connections contribute to the output of that column. Examination of the chart of FIG. 2 and the arrangement of cross-connections in FIG. 1 will demonstrate that when these criteria are met, translation between an incoming code group and a desired reflected binary code group with parity check can be accomplished. It will be recognized that the output code group appearing as the settings of binary counters 44, 46, 48, and 50, associated respectively with column conductors 18, 20, 22, and 24, occurs simultaneously. This code group is in convenient form for application to further circuitry as a parallel or simultaneous code group. If required, however, it may easily be converted into serial form by well-known techniques.

Figure 3:
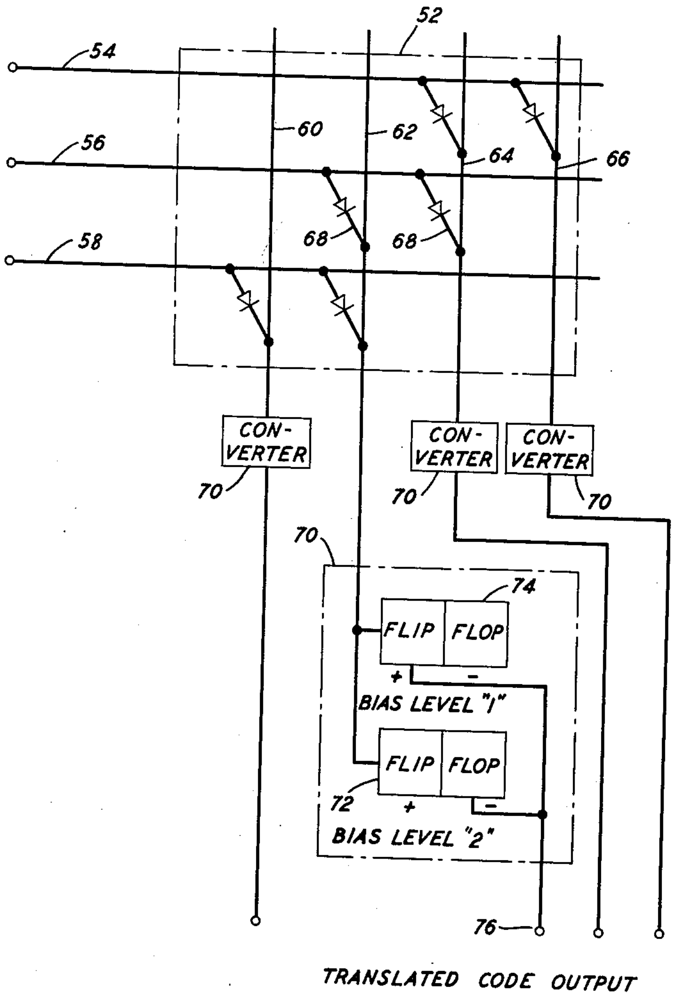
FIG. 3 is an alternative embodiment of the invention arranged to translate between binary code groups and reflected binary code groups having a parity digit, the code elements in both the input and output code groups occurring simultaneously or in parallel.

An alternative arrangement, according to the invention, is shown in FIG. 3 wherein the translating matrix 52 has row conductors 54, 56, and 58 to which may be applied a binary code group, the code elements of which occur simultaneously in parallel form and in accordance with the code shown on the left-hand side of FIG. 2. Matrix 52 also has column conductors 60, 62, 64, and 66 to which cross-connections are made from row conductors 54, 56, and 58 in the same pattern as that employed in the arrangement of FIG. 1. Here, however, the cross-connections are shown, by way of example, as comprising solid-state diodes, such as 68. It will be understood that the translator of FIG. 3 is arranged for translation between the same two codes as that of FIG. 1 and differs from the arrangement of FIG. 1 primarily in the provision for the acceptance of incoming binary code groups in parallel form.

Under these circumstances, all contributions to the column conductors 60, 62, 64, and 66 occur simultaneously and cannot be counted by binary counters as in the arrangement of FIG. 1. They may, however, be added directly so that any of the column conductors of the matrix shown in FIG. 3 may, at most, have an analog output of any of three values: 0, 1, or 2 units in magnitude, respectively. Accordingly, each of the column conductors is connected to an analog-to-digital converter 70, details of which are shown in connection with column conductor 62.

Basically, the converters 70 comprise a pair of flip-flop circuits 72 and 74 to which the summed column conductor output may be applied. Flip-flop circuit 72 is biased to respond only to inputs of amplitude 2, while flip-flop circuit 74 responds to input signals of amplitudes 1 or 2. Further, flip-flop 72 is arranged to produce a negative output pulse when triggered and flip-flop 74 to produce a positive pulse of the same amplitude when triggered. These outputs are summed and appear at output terminal 76, corresponding to column conductor 62. If, for example, no contribution appears on column conductor 62, neither flip-flop 72 nor flip-flop 74 will be triggered and an output of "0" will appear at terminal 76. If a single contribution is present on column conductor 62, only flip-flop 74 will be triggered and an output of amplitude "1" will appear at terminal 76. If, on the other hand, two contributions are present on column conductor 62, both flip-flop 72 and flip-flop 74 will be triggered. Their outputs, however, cancel and a "0," as required by the code under these conditions, will appear at terminal 76.

As in the arrangement of FIG. 1, the circuit of FIG. 3 produces a code group at the output terminals associated with the column conductors, which may already be in the form desired for further use in the system. Here, the output code group appears in parallel form. It may, however, be easily converted by known techniques to serial form if desired. Although not shown, it will be understood that appropriate reset circuitry may be provided to prepare the translator for a second operation.

It will be understood that the invention has been described in its application to a relatively simple translation problem between a three-unit binary code and a three-unit reflected binary code to which a parity digit has been added. The matrix dimensions and the code word lengths may be extended indefinitely, however, and when this is done, the saving in cross-connections and the consequent reduction of leakage and driving problems will be fully realized. For example, a 10 element code can be translated to another 10 element code by a 10×10 matrix instead of a 10×1024 matrix. It is further emphasized that translations between codes other than the codes here employed by way of example may be made through the use of the principles of the invention.

What is claimed is:

1. Translating apparatus for converting $n$-element code groups according to a first code into $m$-element code groups according to a second code which comprises, in combination, a matrix having $n$ input conductors and $m$ output conductors, means for cross-connecting a first of said input conductors to at least first and second ones of said output conductors to the exclusion of cross-connections to others of said output conductors, means for cross-connecting a second of said input conductors to at least said second and said third output conductors to the exclusion of any cross-connection to others of output conductors, means for selectively energizing said input conductors in accordance with the $n$-element code group to be translated, and output means connected to said second output conductor for generating a first symbol in said $m$-element code group whenever any odd number of input conductors cross-connected to said second output conductor are energized and for generating a second symbol in said $m$-element code group whenever any even number of input conductors cross-connected to said second output conductor are energized.

2. Translating apparatus as set forth in claim 1 characterized in that said output means comprises a bistable multivibrator.

3. Translating apparatus as set forth in claim 1 characterized in that said output means comprises a plurality of gates having binarially related bias levels and having means for combining quantities transmitted by said gates upon a single conductor.

References Cited in the file of this patent

UNITED STATES PATENTS 2,933,364 Campbell -------------- Apr. 19, 1960